United States Patent
Baccarin et al.

(10) Patent No.: US 10,054,282 B2
(45) Date of Patent: Aug. 21, 2018

(54) AUTOMOTIVE LIGHT

(71) Applicant: AUTOMOTIVE LIGHTING ITALIA S.p.A., Venaria Reale (IT)

(72) Inventors: Davide Baccarin, Tolmezzo (IT); Stefano Di Gallo, Tolmezzo (IT); Ivan Favro, Tolmezzo (IT); Jean Pascal Herlin, Tolmezzo (IT); Fabio Leone, Tolmezzo (IT); Stefano Marchesin, Tolmezzo (IT); Nicola Schiccheri, Tolmezzo (IT)

(73) Assignee: Automotive Lighting Italia S.p.A., Venaria Reale (IT)

(*) Notice: Subject to any disclaimer, the term of this patent is extended or adjusted under 35 U.S.C. 154(b) by 373 days.

(21) Appl. No.: 14/881,658

(22) Filed: Oct. 13, 2015

(65) Prior Publication Data

US 2016/0102832 A1    Apr. 14, 2016

(30) Foreign Application Priority Data

Oct. 13, 2014    (IT) .............................. TV2014A0147

(51) Int. Cl.
  *F21V 1/00*    (2006.01)
  *F21S 8/10*    (2006.01)
  (Continued)

(52) U.S. Cl.
  CPC .......... *F21S 48/215* (2013.01); *B60Q 1/0058* (2013.01); *F21S 43/14* (2018.01);
  (Continued)

(58) Field of Classification Search
  CPC .... F21S 48/215; F21S 48/217; F21S 48/2237; F21S 48/225; F21S 43/237; F21S 43/247;
  (Continued)

(56) References Cited

U.S. PATENT DOCUMENTS

2009/0262545 A1    10/2009    Amelung et al.
2013/0027960 A1    1/2013    Dubosc et al.

FOREIGN PATENT DOCUMENTS

DE    102009009087    8/2010
DE    202013105597    2/2014
(Continued)

OTHER PUBLICATIONS

Italian Search Report and Written Opinion for Italian Application No. IT TV2014A000147 dated Jun. 1, 2015.

*Primary Examiner* — Elmito Breval
*Assistant Examiner* — Jessica M Apenteng
(74) *Attorney, Agent, or Firm* — McCarter & English, LLP (57) ABSTRACT

An automotive light includes a rear body; a front lenticular half-shell which closes the mouth of the rear body and is provided with at least one transparent/semi-transparent portion; and at least one lighting assembly which emits light upon command and is located within the rear body to backlight the transparent/semi-transparent portion of the front lenticular half-shell. The lighting assembly includes a planar OLED light source which emits light from its front face and is within the rear body with the front face facing the inner surface of the front lenticular half-shell to direct light towards the front lenticular half-shell; a concentrated LED light source behind the planar light source; and a light-guide rod of photoconductive material between the concentrated light source and the planar light source and receives light emitted by the concentrated light source and conveys the light towards the rear face of the planar light source.

15 Claims, 5 Drawing Sheets

(51) Int. Cl.
*F21S 43/14* (2018.01)
*B60Q 1/00* (2006.01)
*F21S 43/145* (2018.01)
*F21S 43/237* (2018.01)
*F21S 43/241* (2018.01)
*F21S 43/243* (2018.01)
*F21S 43/247* (2018.01)
*F21Y 105/00* (2016.01)
*F21Y 105/10* (2016.01)
*F21Y 115/10* (2016.01)
*F21Y 115/15* (2016.01)
*F21W 107/00* (2018.01)

(52) U.S. Cl.
CPC ........... *F21S 43/145* (2018.01); *F21S 43/237* (2018.01); *F21S 43/241* (2018.01); *F21S 43/243* (2018.01); *F21S 43/247* (2018.01); *F21W 2107/00* (2018.01); *F21Y 2105/00* (2013.01); *F21Y 2105/10* (2016.08); *F21Y 2115/10* (2016.08); *F21Y 2115/15* (2016.08)

(58) Field of Classification Search
CPC ...... F21S 43/145; F21S 43/243; F21S 43/241; B60Q 1/0058; F21Y 2105/10; F21Y 2115/10; F21Y 2115/15; F21Y 2105/00; F21W 2101/00; F21W 2107/00
USPC ......................................................... 362/509
See application file for complete search history.

(56) References Cited

FOREIGN PATENT DOCUMENTS

| | | |
|---|---|---|
| EP | 2592332 | 5/2013 |
| EP | 2772683 | 9/2014 |
| KR | 20130036868 | 4/2013 |
| WO | WO 2011101268 | 8/2011 |
| WO | WO 2014156668 | 10/2014 |

AUTOMOTIVE LIGHT

The present invention relates to an automotive light.

More in detail, the present invention regards a rear light for automobiles, use to which the following description will make explicit reference without this implying any loss of generality.

BACKGROUND OF THE INVENTION

As is known, the most recent rear lights for automobiles usually comprise: a rigid rear body which is substantially basin-shaped and is structured so as to be stably recessed into a compartment purposely provided in the rear part of the vehicle body; a front lenticular half-shell, which is arranged to close the mouth of the body so as to surface on the outside of the vehicle body and is provided with a series of transparent or semi-transparent portions, usually of colours different from one another; and a series of lighting assemblies, which are located within the rear body, each immediately underneath a respective transparent or semi-transparent portion of the front lenticular half-shell, so as to be able to backlight said transparent or semi-transparent portion of the half-shell.

In the most up-to-date automotive lights, each lighting assembly is made up of a series of LED diodes (acronym of Light-Emitting Diodes), which are positioned alongside one another, on a supporting board which is provided with the supply and control circuits of the various LED diodes, and is arranged within the body so that the LED diodes face the transparent or semi-transparent portion of the front half-shell.

Unfortunately, LEDs are punctiform light sources therefore a large number of LED diodes is necessary to backlight homogeneously each transparent or semi-transparent portion of the half-shell.

The distribution of the LED diodes, in fact, must be such as to produce a light beam which is capable to meet the photometric specifications envisaged for the light signal associated to the transparent or semi-transparent portion of the half-shell, and which moreover has an intensity of the light as uniform as possible throughout the extension of the transparent or semi-transparent portion so as to meet the aesthetic requirements of manufacturers of automobiles, motorcycles, and the like.

In the course of the last few years, some automobile manufacturers have decided to equip the new models of motor vehicles with rear lights that are able to produce, on the front half-shell thereof, light patterns and/or light signals with particularly elaborate light effects, which in both cases are univocally referable to the individual automobile manufacturers.

In this way, even in conditions of poor or total absence of light, the new models of motor vehicles are readily distinguishable from other automobiles in circulation.

Unfortunately, the need to produce light patterns and/or light effects that are always different is limited by the emitting peculiarities of LED diodes (LEDs are light sources of a punctiform type) and by the dimensions of the supporting board.

SUMMARY OF THE INVENTION

Aim of the present invention is to provide a rear light for automobiles which is able to produce light patterns and/or light effects that are new and different from those produced by the rear lights currently available on the market.

In compliance with the above aims, according to the present invention there is provided an automotive light that generally includes a substantially basin-shaped, rear body which is structured so as to be fixed on the vehicle body; a front lenticular half-shell which is arranged to close the mouth of the rear body and is provided with at least one transparent or semi-transparent portion; and at least one lighting assembly which emits light on command and is located inside the rear body so as to backlight the transparent or semi-transparent portion of the front lenticular half-shell. The at least one lighting assembly of the disclosed automotive light is generally characterized in that it comprises an OLED-type planar light source which is capable of emitting light from its own front face and is located within the rear body with the front face turned towards the inner surface of the front lenticular half-shell so as to direct the emitted light towards the front lenticular half-shell; an LED-type concentrated light source which is arranged spaced apart behind the planar light source; and a light-guide rod made of photoconductive material, which is interposed between the concentrated light source and the planar light source, and is structured so as to receive the light emitted by the concentrated light source and then convey the light towards the rear face of the planar light source.

Additional features, functions and benefits of the disclosed automotive light will be apparent from the detailed description which follows, particularly when read in conjunction with the accompanying drawings.

BRIEF DESCRIPTION OF THE DRAWINGS

The present invention will now be described with reference to the annexed drawings, which illustrate a non-limiting example of embodiment thereof and in which.

DETAILED DESCRIPTION OF THE INVENTION

Figure 1:
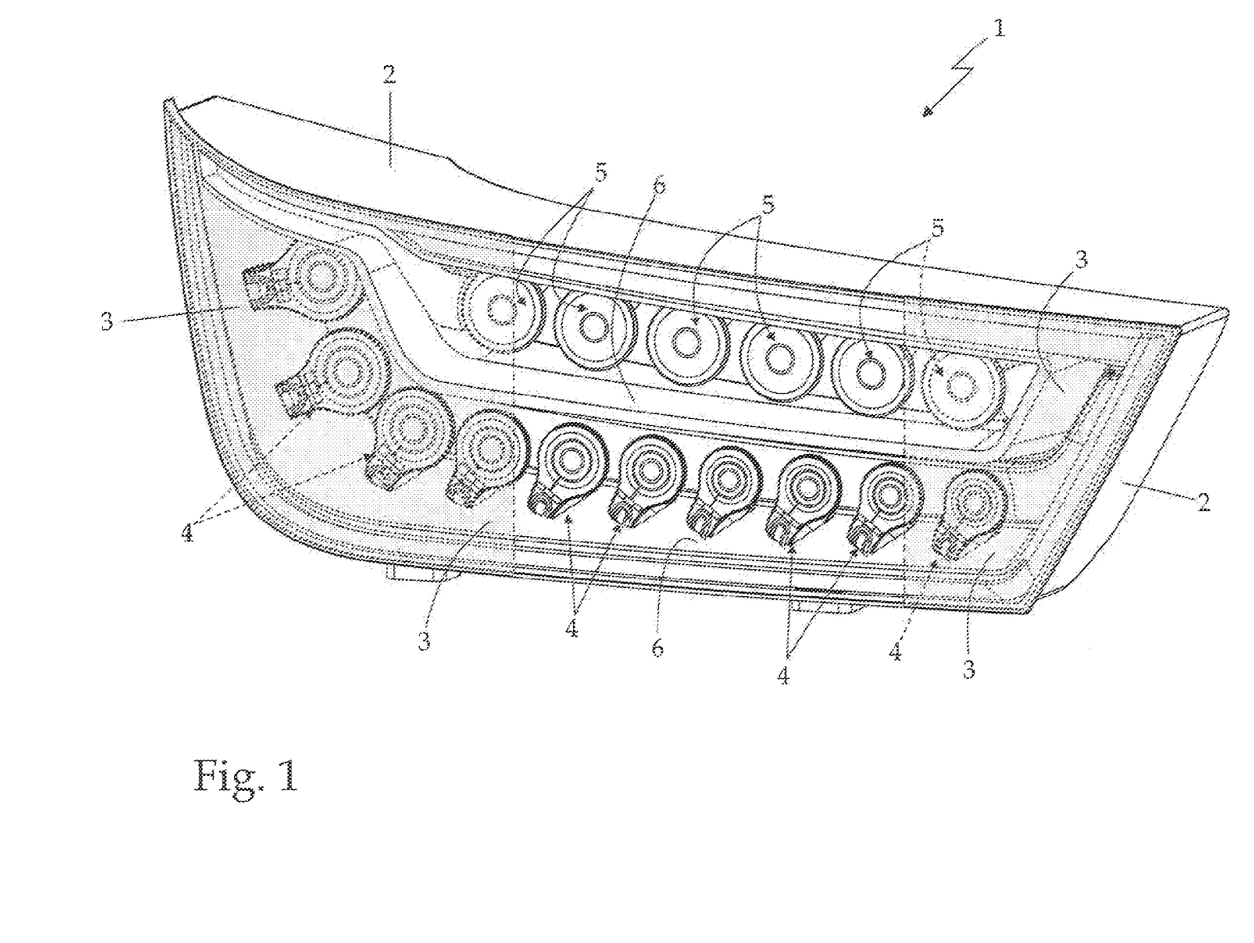
FIG. 1 is a perspective view of a rear light for automobiles realized according to the teachings of the present invention, with parts in section and parts removed for clarity.
Figure 2:
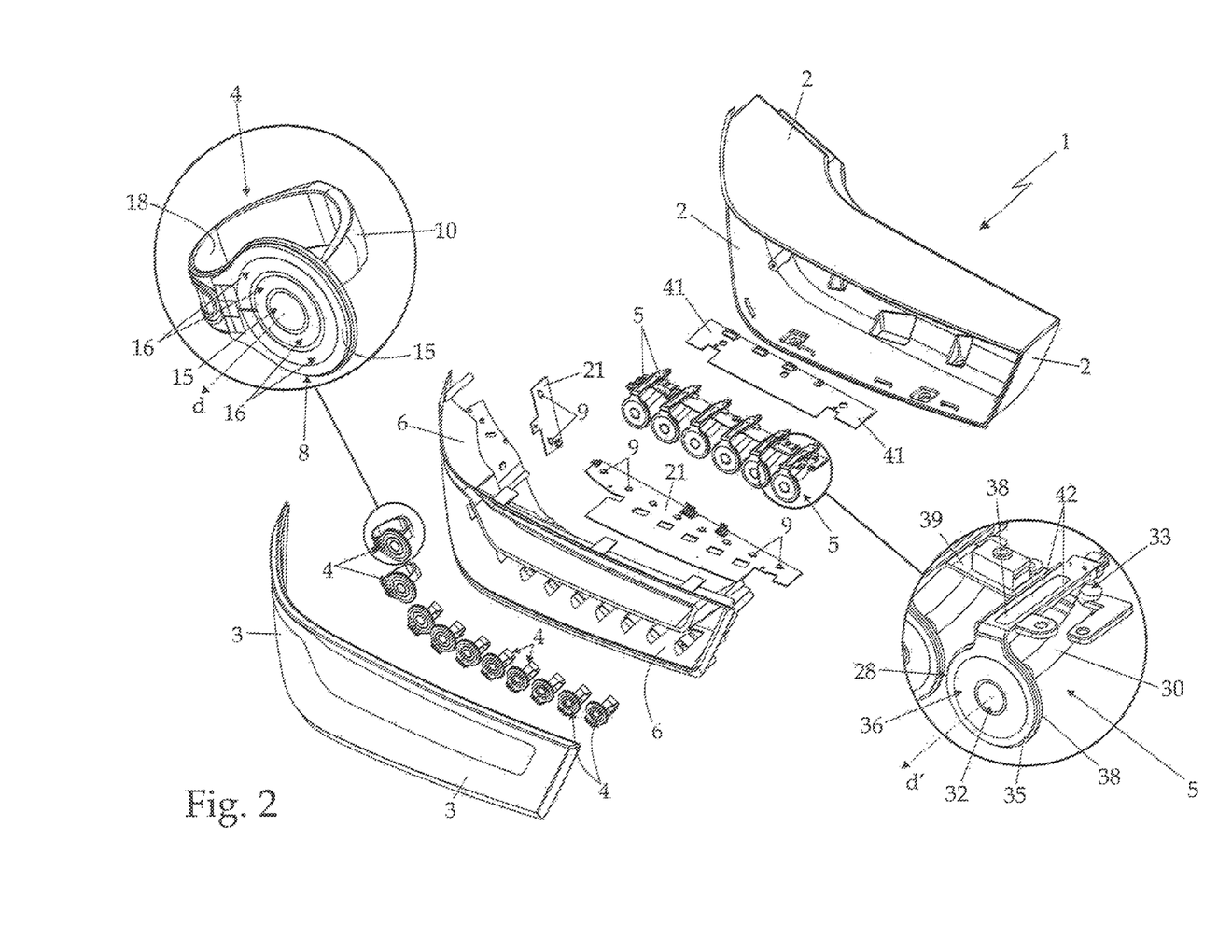
FIG. 2 is an exploded perspective view of the automotive light shown in FIG. 1.

With reference to FIGS. 1 and 2, reference number 1 designates as a whole an automotive light particularly suited to being fixed on the preferably rear part of the vehicle body of an automobile, van, lorry, motorcycle, or the like, i.e. an automotive rear light.

More in detail, the automotive light 1 is preferably, but not necessarily, structured so as to be recessed into the rear part of the vehicle body of an automobile, motorcycle, or similar vehicle, and basically comprises:

a rear body 2 preferably made of plastic material, which is substantially basin-shaped and is preferably structured so as to be stably recessed into a compartment purposely provided in the rear part of the vehicle body (not shown);

a front lenticular half-shell 3 preferably made of plastic material, which is arranged to close the mouth of the rear body 2, preferably, but not necessarily, so that at the same time it surfaces on the outside of the vehicle body (not shown), and is provided with one or more transparent or semi-transparent portions, which may even be coloured; and one or more lighting assemblies 4, each of which emits light on command and is located within the rear body 2 in a position such as to be able to backlight a corresponding transparent or semi-transparent portion of the front lenticular half-shell 3.

More in detail, in the example shown, the front lenticular half-shell 3 is preferably provided with two distinct transparent or semi-transparent portions, optionally also of colours different from one another; and the automotive light 1 is preferably provided with two series of lighting assemblies 4, which are structured to emit light when electricity powered and are located within the rear body 2 so as to be able to backlight separately the two transparent or semi-transparent portions of the front lenticular half-shell 3.

In other words, the automotive light 1 is preferably provided with a first set of lighting assemblies 4, which are located within the rear body 2 in a position such as to be able to backlight a first transparent or semi-transparent portion of the front half-shell 3; and with a second set of lighting assemblies 5, which are located within the rear body 2 in a position such as to be able to backlight the second transparent or semi-transparent portion of the front half-shell 3.

Each lighting assembly 4 is therefore located underneath a corresponding sector of the first transparent or semi-transparent portion of the half-shell 3 so as to be able to backlight the same sector of the front lenticular half-shell 3.

Likewise, each lighting assembly 5 is located underneath a corresponding sector of the second transparent or semi-transparent portion of the half-shell 3 so as to be able to backlight the same sector of the front lenticular half-shell 3.

In the example shown, in particular, the rear body 2 is preferably made of opaque plastic material, preferably via an injection-moulding process. The front lenticular half-shell 3 is, instead, preferably made of transparent or semi-transparent plastic material, such as, for example, transparent or semi-transparent polycarbonate or polymethyl methacrylate, also in this case preferably via an injection-moulding process.

Figure 3:
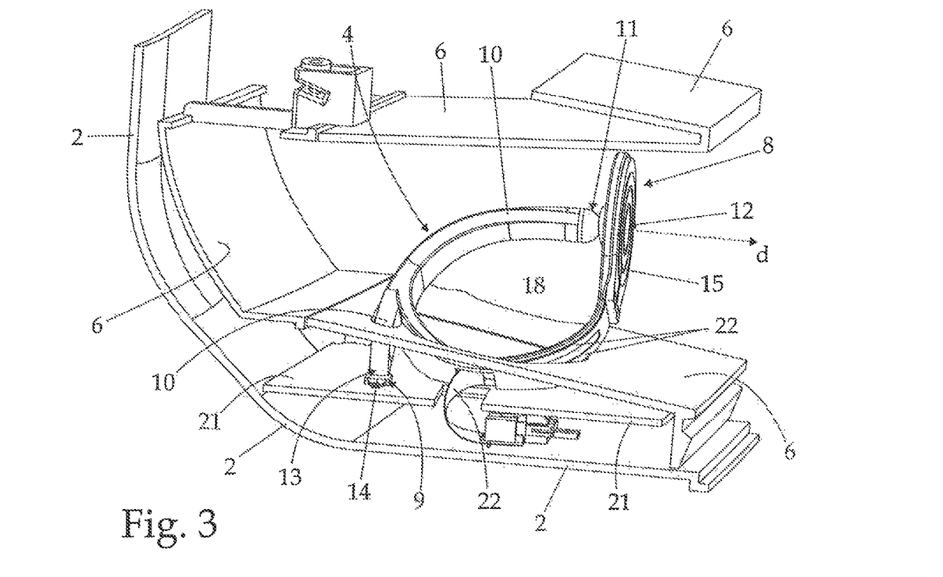
FIG. 3 is a perspective view of a portion of the automotive light shown in FIG. 1.

With reference to FIGS. 1, 2 and 3, the automotive light 1 is preferably also provided with a covering mask 6 made of opaque material, which is located inside the rear body 2, underneath the front lenticular half-shell 3, and is structured to support and also hide from view part of the lighting assemblies 4 and/or 5.

As for the rear body 2, also covering mask 6 is preferably made of opaque plastic material, preferably via an injection-moulding process.

With reference to FIGS. 1, 2, 3, 4 and 5, at least one and preferably all of the lighting assemblies 4 in turn comprise:

an OLED-type (acronym of Organic Light-Emitting Diode) planar light source 8, which is capable to emit light in a distributed way from its own front face, and is located within the rear body 2 with the front face turned towards the inner surface of the corresponding transparent or semi-transparent portion of the front lenticular half-shell 3 so as to direct the light produced towards the front lenticular half-shell 3;

an LED-type (acronym of Light-Emitting Diode) concentrated light source 9, which is arranged spaced apart behind the planar light source 8, i.e. on the side opposite to the front half-shell 3; and finally a light-guide finger or rod 10 made of photoconductive material, which is interposed between the concentrated light source 9 and the planar light source 8 and is structured to receive/collect the light emitted by the concentrated light source 9, and then channel/convey said light towards the rear face of the planar light source 8.

Figure 4:
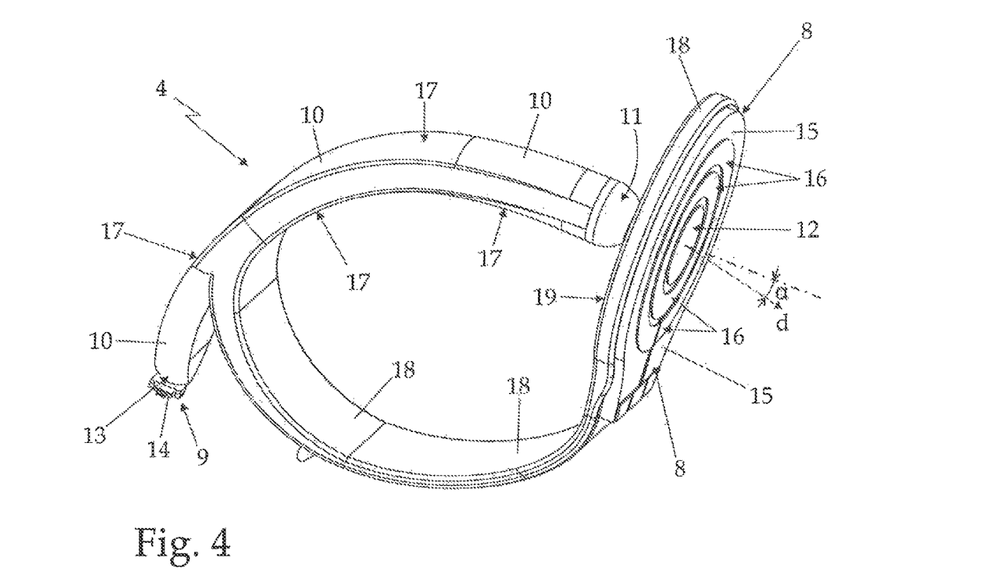
FIG. 4 is a perspective view of a first set of components of the automotive light shown in FIGS. 1 and 2.
Figure 5:
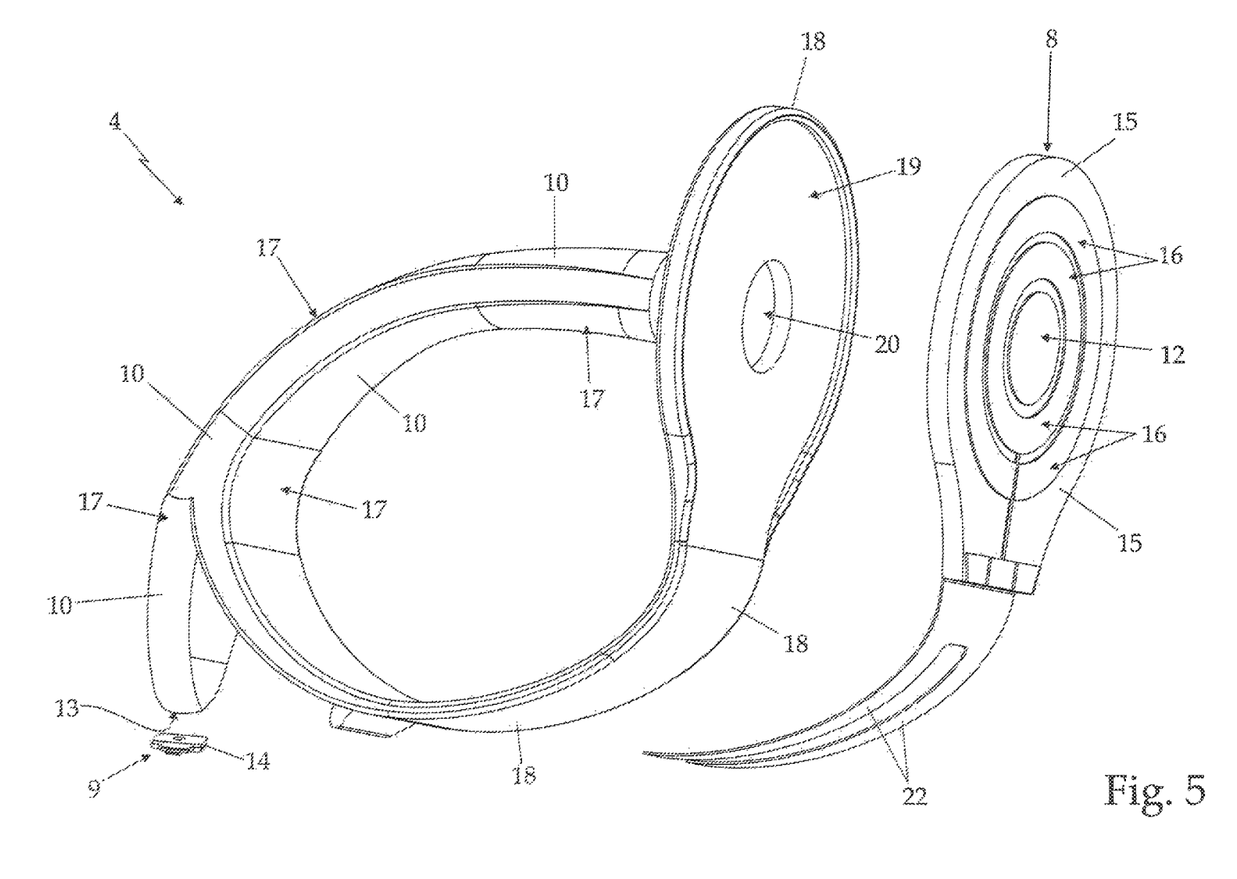
FIG. 5 is an exploded perspective view of the component shown in FIG. 4, with parts removed for clarity.

More in detail, the light-guide rod 10 has its distal end 11 placed close to a transparent portion 12 of the planar light source 8, and its proximal end 13 placed close to the concentrated light source 9 so that the light rays emitted by the concentrated light source 9 can penetrate into the light-guide rod 10 through the proximal end 13.

The light-guide rod 10 is moreover structured so that the light rays that enter through the proximal end 13 can travel into the light-guide rod 10 up to the distal end 11 by virtue of the same physical principles that regulate propagation of light within optical-fibre cables, and can then come out from the distal end 11 of the light-guide rod 10 directed towards the transparent portion 12 of the planar light source 8.

In the example illustrated, in particular, the planar light source 8 is preferably arranged within the rear body 2 with the front face locally substantially parallel to the inner surface of the transparent or semi-transparent portion of the front half-shell 3, so as to direct the light produced towards the front lenticular half-shell 3 preferably with an angle of incidence near to 90° with respect to the latter.

Preferably, the planar light source 8 is moreover substantially circular in shape, and the transparent portion 12 is preferably located roughly at the centre of the planar light source 8 itself.

With particular reference to FIG. 3, preferably the concentrated light source 9 is moreover located underneath the covering mask 6, and the light-guide rod 10 engages in a through manner the covering mask 6 before reaching the planar light source 8.

In addition, the light-guide rod 10 is preferably shaped so as to extend from the concentrated light source 9 up to the planar light source 8 following a curved line/path.

Preferably, but not necessarily, the distal end 11 of the light-guide rod 10 is moreover structured so as to collimate the light rays coming out from the light-guide rod 10 in a predetermined direction d that may or may not be locally perpendicular to the front face of the planar light source 8.

In other words, with reference to FIG. 4, the collimation direction d of the light rays coming out from the distal end 11 of the light-guide rod 10 and passing through the planar light source 8 may be inclined by an angle $\alpha$ greater than 0° with respect to the perpendicular to the front face of the planar light source 8.

With reference to FIGS. 3, 4 and 5, in the example shown, in particular, the concentrated light source 9 is preferably a punctiform light source, and comprises a single LED diode 14 (acronym of Light-Emitting Diode), which is arranged in abutment on, or in any case close to the proximal end 13 of the light-guide rod 10 so as to direct the emitted light into the light-guide rod 10.

The planar light source 8, instead, preferably comprises a single plate-shaped OLED diode 15 (acronym of Organic Light-Emitting Diode), which is located within the rear body 2 with its own front face turned towards the front lenticular half-shell 3, so as to direct the light that comes out from the front face of the diode perpendicularly to the surface of the latter, towards the front lenticular half-shell 3 preferably with an angle of incidence near to 90°.

Preferably, the plate-shaped OLED diode 15 is moreover structured so as to emit light only from its front face, i.e. from the face turned towards the front half-shell 3.

More in detail, in the example shown, the plate-shaped OLED diode 15 is substantially circular in shape and has its own rear face (i.e. the face turned towards the distal end 11 of the light-guide rod 10) appropriately rendered opaque and/or mirror-finished so as to reflect the incident light towards the front face of the OLED 15.

The central part of the OLED diode 15, i.e. the part of the OLED diode 15 locally facing and aligned with the distal end 11 of the light-guide rod 10, is instead as a whole structured so as to be transparent and preferably also photo-inactive, so as to allow the light coming out from the distal end 13 of the light-guide rod 10 to pass freely through the OLED 15.

The transparent central part of the plate-shaped OLED diode 15 hence forms the transparent portion 12 of the planar light source 8.

Preferably, the plate-shaped OLED diode 15 is moreover structured so as to have two distinct, annular-shaped, photo-emitting areas 16 which are arranged concentric to one another and to the transparent central area 12, and are activable independently of one another.

With reference to FIGS. 2, 3, 4, and 5, preferably the light-guide rod 10 is instead shaped so as to extend from the concentrated light source 9 up to the planar light source 8 following an arched line/path, and is preferably, but not necessarily, made of transparent polycarbonate, transparent polymethyl methacrylate (traditionally referred to as Plexiglas) or other similar transparent plastic material, preferably via an injection-moulding process.

With reference to FIGS. 4 and 5, preferably the external lateral surface 17 of light-guide rod 10 is moreover metallized or otherwise mirror-finished so as to prevent the light that travels within the light-guide rod 10 from coming out of the rod in areas different from its distal end 11.

In addition to the above, with reference to FIGS. 2, 3, 4, and 5, the lighting assembly 4 also comprises a supporting member 18, which is structured so as to keep the planar light source 8 stably suspended in front of the distal end 11 of the light-guide rod 10, and is made in one piece with the light-guide rod 10 itself.

More in detail, the supporting member 18 is preferably made in one piece with the light-guide rod 10 via an injection-moulding process.

Preferably, the rigid structure formed by the light-guide rod 10 and by the supporting member 18 is moreover rigidly fixed on the covering mask 6 so as to keep the planar light source 8 stably close to the front lenticular shell 3.

In the example illustrated, in particular, the supporting member 18 preferably has an oblong shape and connects/joins the light-guide rod 10 just downstream of the proximal end 13 of the rod; whereas the planar light source 8 is preferably fixed/housed on the distal end 19 of the supporting member 18.

More in detail, in the example shown the distal end 19 of supporting member 18 is preferably shaped substantially like a circular pan, and is dimensioned so as to be able to accommodate the plate-shaped OLED diode 15.

Preferably, but not necessarily, the distal end 19 of the supporting member 18 is moreover also provided with a through central hole 20, which is aligned with the distal end 11 of the light-guide rod 10 and is dimensioned so as to allow the light coming out from the light-guide rod 10 to reach and traverse the planar light source 8, or rather the plate-shaped OLED diode 15.

In a different embodiment, instead of the through central hole 20, the distal end 19 of supporting member 18 may present a lenticular body, which is preferably shaped so as to co-operate with the distal end 11 of light-guide rod 10 for collimating, in the direction d, the light rays coming out from the light-guide rod 10.

With reference to FIGS. 3, 4 and 5, in the example shown, moreover, the light-guide rod 10 and the supporting member 18 are preferably as a whole shaped so as to form a monolithic rigid body substantially shaped like a cut ring, i.e., like a C.

With reference to FIGS. 2 and 3, the lighting assembly 4 finally also comprises an electronic control boardboard 21 that directly supports the concentrated light source 9, or rather the LED diode 14, and incorporates the electronic circuits for supply and control of the concentrated light source 9.

In the example shown, in particular, the electronic control boardboard 21 is preferably located underneath the covering mask 6, clode to the rear body 2.

Preferably, the electronic control boardboard 21 moreover incorporates also the electronic circuits for supply and control of the planar light source 8, and the planar light source 8, or rather the plate-shaped OLED diode 15, is electrically connected to the control boardboard 21 via electrical leads 22 which extend over the outer surface of the supporting member 18, from the distal end 19 of supporting member 18 up to the area of supporting member 18 that engages the covering mask 6.

With reference to FIGS. 1, 2, and 3, in the example shown, moreover, some lighting assemblies 4 share the same electronic control boardboard 21.

In other words, the electronic control boardboard 21 supports a plurality of concentrated light sources 9, each of which faces the proximal end 13 of a respective light-guide rod 10.

Figure 6:
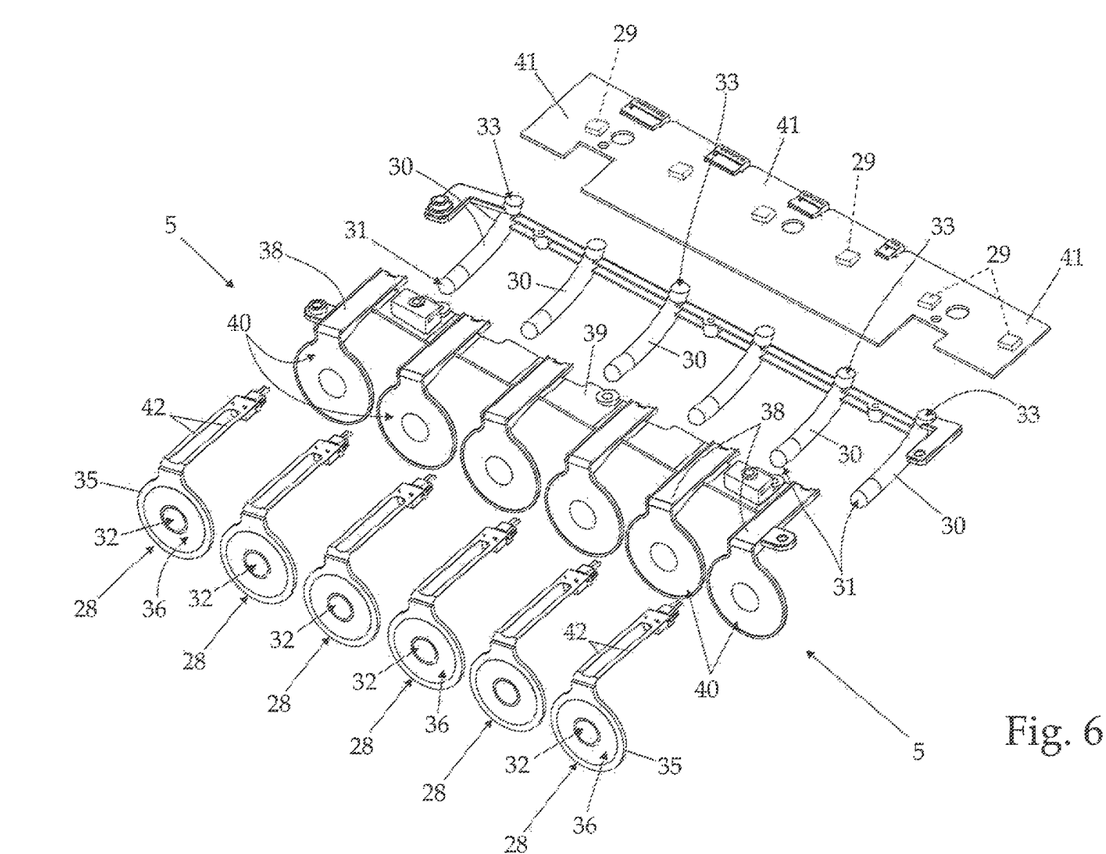
FIG. 6 is an exploded perspective view of a second component of the automotive light shown in FIGS. 1 and 2.

With reference to FIGS. 1, 2 and 6, as for the lighting assembly or assemblies 4, at least one and preferably all of the lighting assemblies 5 comprise:

an OLED-type (acronym of Organic Light-Emitting Diode) planar light source 28, which is able to emit light in a distributed way from its own front face, and is located within the rear body 2 with the front face turned towards the inner surface of the corresponding transparent or semi-transparent portion of the front lenticular half-shell 3 so as to direct the light produced towards the front lenticular half-shell 3;

an LED-type (acronym of Light-Emitting Diode) concentrated light source 29, which is arranged spaced apart behind the planar light source 28, i.e. on the side opposite to the front half-shell 3; and finally a light-guide finger or rod 30 made of photoconductive material, which is interposed between the concentrated light source 29 and the planar light source 28, and is structured so as to receive/collect the light emitted by the concentrated light source 29, and then channel/convey said light towards the rear face of the planar light source 28.

More in detail, the light-guide rod 30 has its distal end 31 located close to a transparent portion 32 or through opening of the planar light source 28, and its proximal end 33 located close to the concentrated light source 29 so that the light rays emitted by the punctiform light source 29 can penetrate into the light-guide rod 30 through the proximal end 33.

The light-guide rod 30 is moreover structured so that the light rays that enter through the proximal end 33 can travel into the light-guide rod 30 up to its distal end 31 by virtue of the same physical principles that regulate propagation of light within optical-fibre cables, and can then come out from the distal end 31 of the light-guide rod 30 directed towards the transparent portion 32 of the planar light source 28.

In the example shown, in particular, the planar light source 28 is preferably arranged within the rear body 2, with the front face locally substantially parallel to the inner surface of the transparent or semi-transparent portion of the front half-shell 3 so as to direct the light produced towards the front lenticular half-shell 3 preferably with an angle of incidence near to 90°.

Preferably, the planar light source 28 moreover is substantially circular in shape, and the transparent portion 32 is preferably located roughly at the centre of the planar light source 28 itself.

Preferably, the concentrated light source 29 is moreover located underneath the covering mask 6, and the light-guide rod 30 engages in a through manner the covering mask 6 prior to reaching the planar light source 28.

In addition, the light-guide rod 30 is preferably shaped so as to extend from the concentrated light source 29 up to the planar light source 28 following a curved line/path.

With reference to FIG. 2, preferably, but not necessarily, the distal end 31 of light-guide rod 30 is moreover structured so as to collimate the light rays coming out from the light-guide rod 30 in a predetermined direction d' that may or may not be locally perpendicular to the front face of the planar light source 28.

With reference to FIG. 6, in the example shown, in particular, the concentrated light source 29 is preferably a punctiform light source and comprises a single LED diode (acronym of Light-Emitting Diode), which is arranged in abutment against, or in any case close to, the proximal end 33 of light-guide rod 30 so as to direct the emitted light into the light-guide rod 30.

With reference to FIGS. 2 and 6, the planar light source 28, instead, preferably comprises a single plate-shaped OLED diode 35 (acronym of Organic Light-Emitting Diode), which is arranged within the rear body 2 with its own front face turned towards the front lenticular half-shell 3 so as to direct the light that comes out from the front face of the diode perpendicularly to the surface of the latter, towards the front lenticular half-shell 3, preferably with an angle of incidence near to 90°.

Preferably, the plate-shaped OLED diode 35 is moreover structured so as to emit light only from its front face, i.e. from the face facing the front half-shell 3.

More in detail, in the example shown, the plate-shaped OLED diode 35 is substantially circular in shape, and has its own rear face (i.e. the face turned towards the distal end 31 of the light-guide rod 30) appropriately rendered opaque and mirror-finished so as to reflect the incident light towards the front face of the OLED 35.

The central part of the OLED 35 diode, i.e. the part of OLED diode 35 locally facing and aligned with the distal end 31 of the light-guide rod 30, is instead as a whole structured so as to be completely transparent and preferably also photo-inactive so as to enable the light coming out from the distal end 33 of the light-guide rod 30 to pass freely through the OLED 35.

The transparent central part of the plate-shaped OLED diode 35 forms the transparent portion 32 of the planar light source 28.

With reference to FIGS. 2 and 6, differently from the plate-shaped OLED diode 15 of the first lighting assembly 4, the plate-shaped OLED diode 35 of the second lighting assembly 5 is preferably structured so as to have only one annular-shaped, photo-emitting area 36, concentric with respect to the transparent central area 32.

Similarly to the light-guide rod 10, also the light-guide rod 30 is preferably, but not necessarily, made of transparent polycarbonate, transparent polymethyl methacrylate (which is traditionally referred to as Plexiglas) or other similar transparent plastic material, preferably via an injection-moulding process.

Preferably, the external lateral surface of the light-guide rod 30 is moreover metallized or otherwise mirror-finished so as to prevent the light that travels within the light-guide rod 30 from coming out of the rod in areas different from its distal end 31.

In addition to the above, with reference to FIGS. 2 and 6, the lighting assembly 5 also comprises a supporting member 38 which is structured to keep the planar light source 28 stably suspended in front of the distal end 31 of the light-guide rod 30, and is preferably rigidly fixed to the light-guide rod 30 itself.

Preferably, the light-guide rod 30 and/or the supporting member 38 are moreover rigidly fixed to the covering mask 6 so as to keep stably the planar light source 28 close to the front lenticular shell 3.

With reference to FIGS. 2 and 6, in the example shown, in particular, the supporting member 38 preferably has an oblong shape, and cantilevered projects from a supporting cross member 39 which, in turn, is preferably rigidly fixed on the covering mask 6, in the gap between the covering mask 6 and the rear body 2; whereas the planar light source 28 is preferably fixed/housed on the distal end 40 of the supporting member 38.

Also the light-guide rod 30 is preferably rigidly fixed to the supporting cross member 39, in the proximity of its proximal end 33, so as to cantilevered project from the same supporting cross member 39 towards the distal end 40 of the supporting member 38.

More in detail, in the example shown, the supporting member 38 is preferably made of an opaque plastic material, preferably via an injection-moulding process.

Preferably, the supporting member 38 moreover has the shape of an L-bent strap which cantilevered projects from the supporting cross member 39, and engages in a through manner the covering mask 6 so as to arrange its distal end 40 in the proximity of the front half-shell 3.

In addition, the distal end 40 of supporting member 38 is preferably substantially shaped like a circular pan so as to be able to accommodate the plate-shaped OLED diode 35.

Preferably, but not necessarily, the distal end 40 of supporting member 38 is moreover also provided with a through central hole, which is aligned with the distal end 31 of the light-guide rod 30 and is dimensioned so as to enable the light coming out from the light-guide rod 30 to reach and traverse the planar light source 28, or rather the plate-shaped OLED diode 35.

With reference to FIGS. 2 and 6, the lighting assembly 5 finally also comprises an electronic control board 41 that directly supports the concentrated light source 29, or rather the LED diode, and incorporates the electronic circuits for supply and control of the concentrated light source 29. Preferably, the electronic control board 41 is moreover located underneath the covering mask 6, i.e. in the gap between the covering mask 6 and the rear body 2.

More in detail, in the example shown, the electronic control board 41 is preferably rigidly fixed on the supporting cross member 39, above the proximal end 33 of the light-guide rod 30.

Preferably, the electronic control board 41 moreover incorporates also the electronic circuits for supply and control of the planar light source 28, and the planar light source 28, or rather the plate-shaped OLED diode 35 is electrically connected to the control board 41 via a series of electrical leads 42 that extend over the outer surface of the supporting member 38 from the distal end 40 of the supporting member 38 up to the transverse supporting beam 39.

With reference to FIGS. 2 and 6, in the example shown, the lighting assemblies 5 moreover preferably share the same supporting cross member 39 and the same electronic control board 41.

In other words, the supporting members 38 of the various lighting assemblies 5 are arranged spaced apart one beside the another along the supporting cross member 39; whereas the light-guide rods 30 are rigidly fixed on the supporting cross member 39, spaced apart one beside the another.

The electronic control board 41, instead, supports the concentrated light sources 29 of the various lighting assemblies 5, and is fixed on the supporting cross member 39 so that each concentrated light source 29 faces the proximal end 33 of a corresponding light-guide rod 30.

General operation of the automotive light 1 is readily inferable from what has been described above and does not require any further explanations.

The advantages associated to the particular structure of the lighting assemblies 4 and 5 are considerable.

First of all, the lighting assemblies 4 and 5 allows to obtain new light patterns and light effects which are particularly elaborate and radically different from those of the automotive lights currently available on the market.

The planar light sources 8 and 28 and the concentrated light sources 9 and 29, in fact, can be turned on in a sequential way. Likewise, the photo-emitting areas 16 and 36 of each planar light source 8, 28 can be turned on in a sequential way in combination with the concentrated light source 9, 29 that illuminates the transparent central portion 12, 32 of the planar light source 8, 28 itself.

Furthermore, the use of the light-guide finger or rod 10, 30 enables the LED-type punctiform light source 9, 29 to be kept at a due distance from the OLED-type planar light source 8, 28, preventing the heat produced by the LED diodes from possibly jeopardizing operation of the OLED diodes.

The operating temperature of the LED diodes, in fact, is much higher than the maximum temperature that can be withstood by the OLED diodes.

In addition, production of the light-guide rod 10 in one piece with the supporting member 18 simplifies enormously the assembly of the lighting assembly 4.

Given that it is made in one piece with the supporting member 18, the light-guide rod 10 does not need to be aligned, during mounting, with the distal end 19 suited to accommodate the planar light source 8.

Last, but not least, the presence of the light-guide finger or rod 10, 30 enables collimation of the light rays coming out from the distal portion 11, 31 of the rod and traversing the transparent central portion 12, 32 of the planar light source 8, 28, in a direction d different from the perpendicular to the front face of the planar light source 8, 28, and hence different from that of the light rays emitted by the same planar light source 8, 28. OLED diodes, in fact, are distributed light sources with emission of a Lambertian type, in which the light rays comes out from the diode in a direction perpendicular to the surface of the diode.

Finally, it is clear that modifications and variations may be made to the automotive light 1 described above, without thereby departing from the scope of the present invention.

For example, instead of being provided with a transparent portion 12, 32, the planar light source 8, 28 may be provided with a through hole appropriately aligned with the distal end 11, 31 of the light-guide rod 10, 20.

In a different embodiment of lighting assembly 5, moreover, the supporting member 38 may be made of opaque material. In this case, the distal end 40 of supporting member 28 is provided with a small through central hole that is aligned with the distal end 31 of the light-guide rod 30 and is dimensioned so as to enable the light coming out from the light-guide rod 30 to reach and traverse the planar light source 28, or rather the plate-shaped OLED diode 35.

In a less sophisticated embodiment, moreover, the rear body 2 could be structured so as to be simply cantilever fixed to the rear part of the vehicle body (not shown).

Although the present disclosure has been described with reference to exemplary embodiments and implementations thereof, the present invention is not limited by or to such exemplary embodiments and/or implementations.

The invention claimed is:

1. An automotive light (1) comprising a substantially basin-shaped, rear body (2) which is structured so as to be fixed on a vehicle body; a front lenticular half-shell (3) which is arranged to close the mouth of the rear body (2) and is provided with at least one transparent or semi-transparent portion; and at least one lighting assembly (4, 5) which emits light on command and is located inside the rear body (2) so as to backlight the transparent or semi-transparent portion of the front lenticular half-shell (3); wherein the at least one lighting assembly (4, 5) comprises: an OLED-type planar light source (8, 28) which is capable of emitting light from its own front face and is located within the rear body (2) with the front face turned towards the inner surface of the front lenticular half-shell (3) so as to direct the emitted light towards the front lenticular half-shell (3); an LED-type concentrated light source (9, 29) which is arranged spaced apart behind the OLED-type planar light source (8, 28); and a light-guide rod (10, 30) made of photoconductive material, which is interposed between the concentrated light source (9, 29) and the OLED-type planar light source (8, 28), and is structured so as to receive the light emitted by said LED-type concentrated light source (9, 29) and then convey said light towards the rear face of the OLED-type planar light source (8, 28).

2. Automotive light according to claim 1, wherein the light-guide rod (10, 30) has its distal end (11, 31) arranged close to a light passageway (12, 32) present in said OLED-type planar light source (8, 28), and its proximal end (13, 33) arranged close to the LED-type concentrated light source (9, 29) so that the light rays emitted by the LED-type concentrated light source (9, 29) can penetrate into the light-guide rod (10, 30) through the proximal end (13, 33); the light-guide rod (10, 30) being moreover structured so that the light rays entering through the proximal end (13, 33) can travel into the light-guide rod (10, 30) up to the distal end (11, 31) and there exit from the light-guide rod (10, 30) directed towards the light passageway (12, 32) of said OLED-type planar light source (8, 28).

3. Automotive light according to claim 2, wherein the distal end (11, 31) of the light-guide rod (10, 30) is structured so as to collimate the light rays coming out from the light-guide rod (10, 30) in a predetermined collimation direction (d, d').

4. Automotive light according to claim 3, wherein said collimation direction (d, d') is inclined by an angle (α) greater than 0° with respect to a plane that is perpendicular to the front face of the OLED-type planar light source (8, 28).

5. Automotive light according to claim 2, wherein the OLED-type planar light source (8, 28) is substantially circular in shape, and the light passageway (12, 32) is located substantially at the centre of said OLED-type planar light source (8, 28).

6. Automotive light according to claim 5, wherein the OLED-type planar light source (8, 28) is provided with one or more annular-shaped, photo-emitting areas (16, 36) which are arranged concentric to one another and to the light passageway (12, 32) of the OLED-type planar light source (8, 28).

7. Automotive light according to claim 1, wherein the light-guide rod (10, 30) is shaped so as to extend from the LED-type concentrated light source (9, 29) up to the OLED-type planar light source (8, 28) following a curved line or path.

8. Automotive light according to claim 1, wherein said at least one lighting assembly (4, 5) additionally comprises a supporting member (18, 38) which is structured so as to keep the OLED-type planar light source (8, 28) stably suspended in front of the distal end (11, 31) of the light-guide rod (10, 30).

9. Automotive light according to claim 8, wherein the supporting member (18) is made in one piece with the light-guide rod (10).

10. Automotive light according to claim 9, wherein the light-guide rod (10) and the supporting member (18) are as a whole shaped so as to form a cut-ring-shaped, monolithic rigid body.

11. Automotive light according to claim 1, further comprising a covering mask (6) made of opaque material and which is located within the rear body (2), underneath the front lenticular half-shell (3), and is structured so as to support and partially hide from view said at least one lighting assembly (4, 5).

12. Automotive light according to claim 11, wherein the LED-type concentrated light source (9, 29) is located underneath the covering mask (6), and in that the light-guide rod (10, 30) engages in a through manner said covering mask (6) prior to reaching the OLED-type planar light source (8, 28).

13. Automotive light according to claim 1, wherein the LED-type concentrated light source (9, 29) is a punctiform light source and comprises a LED (14) which is arranged close to the proximal end (13, 33) of the light-guide rod (10, 30) so as to direct the emitted light into the light-guide rod (10, 30).

14. Automotive light according to claim 1, wherein the OLED-type planar light source (8, 28) comprises a plate-shaped OLED (15) which is arranged within the rear body (2) with its own front face turned towards the front lenticular half-shell (3), so as to direct the light coming out from the front face of the plate-shaped OLED (15) towards the front lenticular half-shell (3).

15. Automotive light according to claim 14, wherein the plate-shaped OLED (15) is structured so to emit light only from the front face.

\* \* \* \* \*